(12) United States Patent
Sorbara et al.

(10) Patent No.: US 8,413,000 B2
(45) Date of Patent: Apr. 2, 2013

(54) RETRANSMISSION ABOVE THE GAMMA INTERFACE

(75) Inventors: Massimo Sorbara, Freehold, NJ (US); Ravindra M. Lambi, Old Bridge, NJ (US); Julien D. Pons, Metuchen, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 434 days.

(21) Appl. No.: 12/620,832

(22) Filed: Nov. 18, 2009

(65) Prior Publication Data
US 2010/0138714 A1    Jun. 3, 2010

Related U.S. Application Data (60) Provisional application No. 61/119,133, filed on Dec. 2, 2008.

(51) Int. Cl.
*G06F 11/00*    (2006.01)
(52) U.S. Cl. .................................................. 714/748
(58) Field of Classification Search ............... 714/748
See application file for complete search history.

(56) References Cited

U.S. PATENT DOCUMENTS

| | | | |
|---|---|---|---|
| 5,581,228 A | 12/1996 | Cadieux et al. | |
| 7,000,021 B1 | 2/2006 | Radhakrishnan et al. | |
| 7,085,232 B1 | 8/2006 | Raissinia et al. | |
| 2002/0158797 A1 | 10/2002 | Kelly et al. | |
| 2003/0112860 A1 | 6/2003 | Erdogan | |
| 2004/0123211 A1 | 6/2004 | Kozintsev et al. | |
| 2005/0078690 A1 | 4/2005 | DeLangis | |
| 2005/0111346 A1 | 5/2005 | Santhoff et al. | |
| 2005/0120124 A1 | 6/2005 | Korhonen | |
| 2005/0286424 A1 | 12/2005 | Peeters et al. | |
| 2007/0120958 A1 | 5/2007 | Sunahara | |
| 2007/0168824 A1 | 7/2007 | Fukushima et al. | |
| 2007/0198898 A1 | 8/2007 | Ysebaert et al. | |
| 2007/0274215 A1 | 11/2007 | Gusat et al. | |
| 2008/0052609 A1 | 2/2008 | Peng et al. | |
| 2008/0063007 A1 | 3/2008 | Christiaens et al. | |
| 2008/0165905 A1 | 7/2008 | Heise et al. | |
| 2008/0209297 A1 | 8/2008 | Chandra et al. | |
| 2009/0089638 A1* | 4/2009 | Heise et al. | 714/748 |
| 2009/0089641 A1* | 4/2009 | Schedelbeck et al. | 714/748 |
| 2009/0313517 A1* | 12/2009 | Schedelbeck et al. | 714/748 |
| 2010/0070817 A1* | 3/2010 | Heise | 714/749 |

OTHER PUBLICATIONS

Conexant, Infineon AG, Infineon NA, 2-Wire, Nokia-Siemens, Ikanos, Aware, "G.inp: Proposed Protocol for Retransmission Above the Gamma Interface," Contribution C659, ITU-T SG 15, Feb. 11-23, 2008, Geneva, Switzerland.

(Continued)

*Primary Examiner* — Michael Maskulinski
(74) *Attorney, Agent, or Firm* — Pillsbury Winthrop Shaw Pittman LLP (57) ABSTRACT

Embodiments disclosed herein are configured for retransmission above the gamma ($\gamma$) interface. At least one embodiment of a method includes receiving data from an Ethernet layer, the data being identified as eligible for retransmission or not eligible for retransmission; in response to a determination that the data is eligible for retransmission, storing a copy of at least a portion of the data in a retransmission queue; and transmitting the data across a gamma ($\gamma$) interface to a packet transfer mode transmission convergence layer.

19 Claims, 8 Drawing Sheets

OTHER PUBLICATIONS

Editor of VDSL2, "G.vdsl, G.adsl: Report of Ad Hoc Teleconference Call on INP," Jan 31, 2007 Ad Hoc Report uploaded to the "Teleconference calls\Jan. 31, 2007 INP" directory in the Napa Valley directory of the informal Q4 ftp site.

Broadcom, "ADLS:G.vdsl: Control parameters and performance of a retransmission scheme," Contribution C-0090, Oct. 2006, Geneva, Switzerland.

Broadcom, "G. ADLS/G. VDSL: Further results on retransmission," Contribution SD-042, San Diego, CA Jan. 2007.

Broadcom, "G. ADSL/G.VDSL: Comparison of retransmission and interleaving," Contribution NC-063, Apr. 16-20, 2007, San Diego, CA.

Ikanos, "ADLS, G.vdsl: Comparison of impulse noise protection schemes," Contribution SD-023, Jan. 15-19, 2007, San Diego, CA.

Conexant, "G.gen (VDSL & ADSL): Questions and Issues Regarding Retransmissions at the DSL PHY Layer," SD-054, Jan. 15-19, 2007, San Diego, CA.

Texas Instrument "G.vds12: Performance Reason for Interleaving on All Latency Paths", Contribution D-0327, May 16-27, 2005, Geneva, Switzerland.

Conexant, "G.vdsl, ADSL: Evaluation of Impulse Noise Protection Methods per the Test Cases in the Jan. 31, 2007 Teleconference Ad Hock Report," Contribution NC-027, Apr. 16-20, 2007, Napa Valley, CA.

\* cited by examiner

RETRANSMISSION ABOVE THE GAMMA INTERFACE

CROSS REFERENCE

This application claims the benefit of copending U.S. Provisional patent application entitled "Proposed Framework for Retransmission Above the Gamma-Interface," filed Dec. 2, 2008 and accorded application Ser. No. 61/119,133, which is entirely incorporated herein by reference.

BACKGROUND

In very high speed digital subscriber line (VDSL) systems and asynchronous digital subscriber line (ADSL) systems, errors in transmission of data, such as impulse noise, can occur. While these errors may be substantially inconsequential for unprotected data, such as high speed Internet data and Voice over Internet Protocol (VoIP), protected data applications such as streaming video may be very susceptible to these errors and require added protection through retransmission.

SUMMARY

Embodiments disclosed herein are configured for retransmission above the gamma ($\gamma$) interface. At least one embodiment of a retransmission method includes receiving data from an Ethernet layer, the data being identified as eligible for retransmission or not eligible for retransmission; in response to a determination that the data is eligible for retransmission, storing a copy of at least a portion of the data in a retransmission queue; and transmitting the data across a gamma ($\gamma$) interface to a packet transfer mode transmission convergence layer.

Also included are additional embodiments of a system. At least one additional embodiment of a system includes a demultiplexor configured to receive data from a transmitter device sent across a gamma ($\gamma$) interface, the demultiplexor configured to determine whether the received data is at least one of the following: eligible for retransmission, not eligible for retransmission, and retransmitted or new transmission; and a retransmission buffer coupled to the demultiplexor, the retransmission buffer configured to, in response to a determination that the received data is eligible for retransmission, determine whether the received data has any uncorrectable error or if any correctly received new data has any gap in received sequence identification number and, in response to either event, a determination that the data includes at least one uncorrectable error, send a retransmission request across the gamma ($\gamma$) interface to the transmitter device to facilitate retransmission of (at least a portion of) the data.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

This contribution proposes a technique for retransmission in digital subscriber line (DSL) systems at a level above the gamma interface ($\gamma$-interface). A key advantage to defining retransmissions above the $\gamma$-interface is that the same mechanism may be applied to different DSL physical layer (PHY) protocols (e.g. both ADSL2 and VDSL2) as is done with DSL bonding in the G.998.x series of Recommendations. Another advantage is that retransmissions may be applied only to the packets that require low error rates and are not sensitive to the effects of latency, such as the transport of video data. Packets transporting data for latency sensitive applications, such as voice or gaming may bypass the retransmissions operation. Described herein is a retransmission method with operation above the $\gamma$-interface. Also described herein are cases with and without bonding. This disclosure discusses embodiments where retransmission is defined above the $\gamma$-interface.

There is interest for use of retransmission in DSL applications. The goal of ITU-T Recommendation G.inp is to define a recommendation for retransmission in conjunction with G.993.2. Interest has been expressed to apply retransmission to other PHYs such as ADSL2plus. By defining retransmission above the $\gamma$-interface, the same retransmission technique may be applied to different PHY recommendations such as ADSL2/2+ and VDSL2. This is a concept that has been applied in the definition of the G.998.x series of DSL bonding recommendations. In this proposed framework, embodiments discussed herein include operation of retransmission above the $\gamma$-interface in a standalone fashion. Additionally illustrated are the extensions for use with bonding.

Similarly, embodiments disclosed herein apply retransmission only to packets having low error rate requirements such as video; for applications that are sensitive to delay, the corresponding packets may bypass the retransmission mechanism. For G.inp, at least one embodiment facilitates that retransmission operates above the γ-interface per the framework provided in this contribution.

Figure 1:
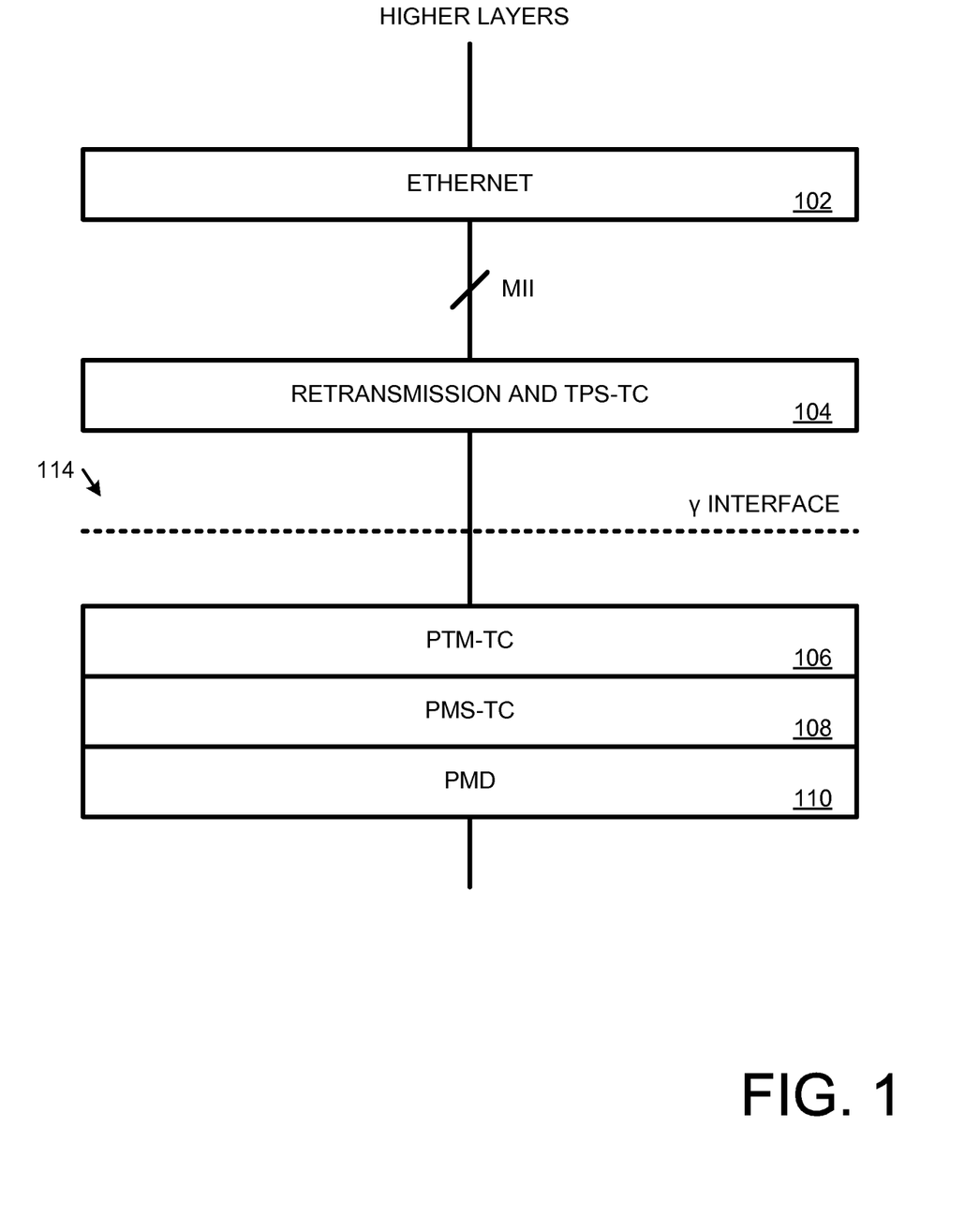
FIG. 1 illustrates an example embodiment of a computing environment, which includes a retransmission layer above the $\gamma$ interface.

Referring now to the drawings, FIG. 1 shows a protocol reference model for retransmission above a γ-interface 114 as it applies for packet transfer mode. A retransmission layer 104 resides between an Ethernet layer 102 and a packet transfer mode transmission convergence (PTM-TC) layer 106. The PMT-TC layer 106 may also be coupled to a physical media specific-transmission convergence (PMS-TC) layer 108, which is coupled to a physical medium dependent (PMD) layer 110.

The packets received from the Ethernet layer 102 may be designated on corresponding quality of service (QOS) requirements. As a nonlimiting example, as video packets require low error rate but they are not as sensitive to latency, these packets may be designated as "eligible for retransmission." Packets serving applications that require low latency or are very sensitive delay variation requirements, such as voice over Internet protocol (VoIP) or gaming, may be designated as "not-eligible for retransmission." Data transmission units (DTUs) formed in the retransmission layer 104 are fed to the PTM-TC layer 106 across the γ-interface 114 for transmission on the line.

Figure 2:
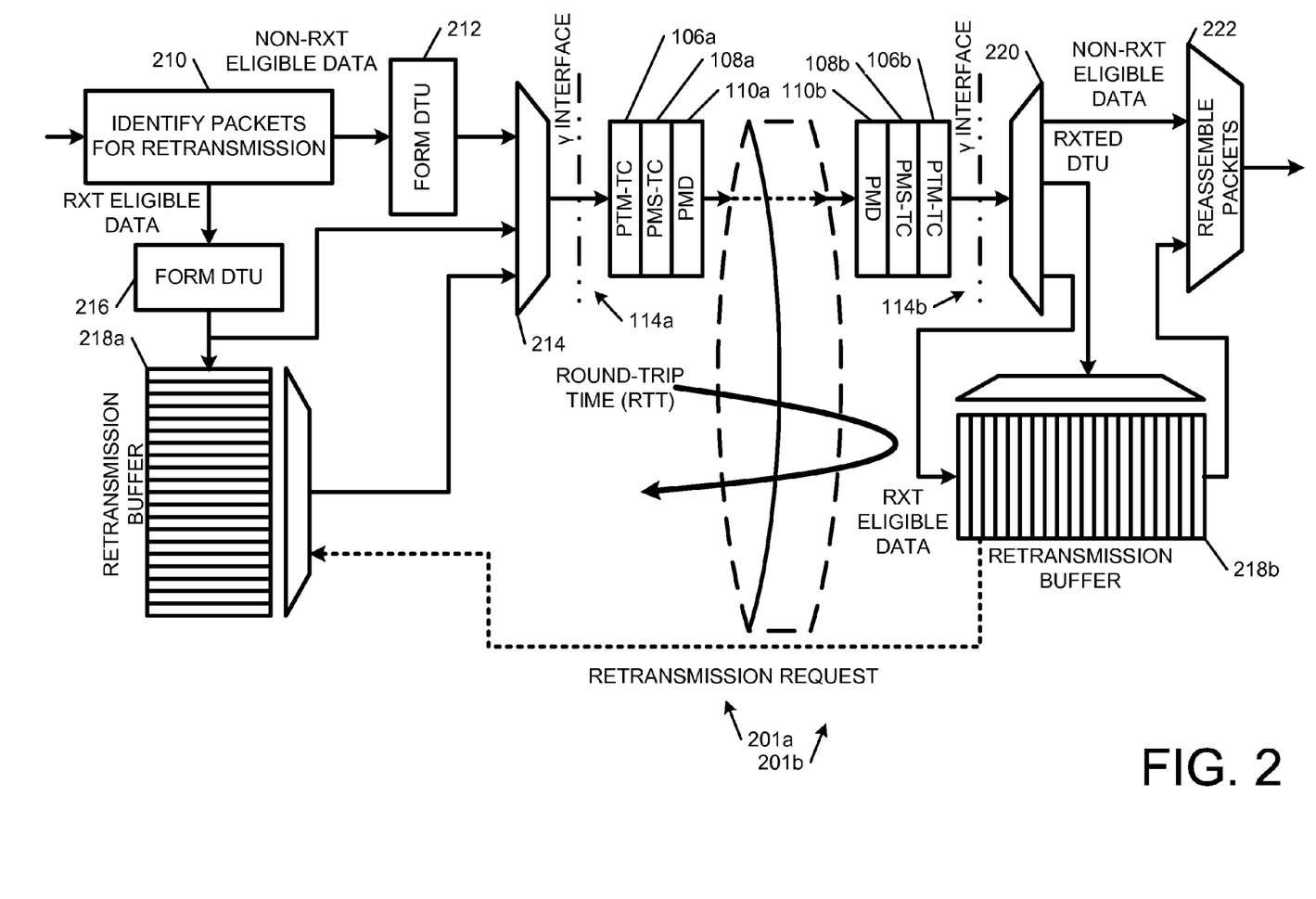
FIG. 2 illustrates an example embodiment of a computing system, utilizing a retransmission layer, such as may be utilized in the environment from FIG. 1.

FIG. 2 shows a system model for operation of retransmissions. The packets are flagged as "eligible for retransmission" or "not eligible for retransmission" based on their QoS requirements. For packets flagged as "not-eligible," the retransmission mechanism is bypassed. Some overhead bits are added forming a data transmission unit (DTU). The overhead added in the DTU will identify the contained packet as being "not-eligible" for retransmission. For packets flagged as "eligible for retransmission," the resulting DTUs are transmitted on the line and the DTUs are also stored in the receiver side retransmission buffer 218a; each DTU in this buffer is flagged as "eligible for retransmission." The DTUs from each path are multiplexed at multiplexor 214 and forwarded across the γ-interface 114 to the PTM-TC layer 106 for transmission within a single bearer.

If the system is not capable of separating the packets for flagging as "eligible" or "not-eligible" for retransmission, then all of the packets may be sent through the transmitter side retransmission buffer 218a. In this case, all packets would be eligible for retransmission. At the receive side 201b, each received DTU is first examined for eligibility of retransmission. If the received DTU is "not-eligible" for retransmission, it is passed on to the upper layer after the overhead is removed. If the received DTU is eligible for retransmission, it is loaded into the receiver side retransmission buffer 218b. If an error in the data block or a break in the sequence ID of correctly received data is detected, a retransmission request is sent to the far end transmitter side 201a identifying the corresponding sequence ID(s). The correctly received fragmented DTUs are then reassembled into the original packet and then forwarded to the upper layer.

As a nonlimiting example, a plurality of packets from an upper layer (e.g., the Ethernet layer 102) may be received at a transmitter side 201a at block 210. Block 210 may be configured to identify packets that are eligible for retransmission. If one or more packets are eligible for retransmission, the one or more packet(s) may be assembled (per DTU block 216) into DTUs. The DTUs may then be stored in the transmitter side retransmission buffer 218a. Additionally, a copy of the DTU may be sent to multiplexor 214 for transmission across the γ interface 114a to the PTM-TC layer 106a, which then sends the data to the PMS-TC layer 108a and on to the PMD layer 110a.

If, however, the block 210 determines that one or more packets are not eligible for retransmission, those packets are sent to DTU block 212 for conversion to DTUs. The DTUs from the DTU block 212 are sent to the multiplexor 214 for sending to a receiver side 201b, across the γ interface 114a.

The DTUs may then be received at the receiver side 201b at a PMD layer 110b, and sent across a γ interface 114b via a PMS-TC layer 108b and a PTM-TC layer 106b. The DTUs are then received at a demultiplexor 220, which checks the integrity of the received data, and for the correctly received data, determines whether the DTUs are eligible for retransmission or not eligible for retransmission. If the DTUs are not eligible for retransmission, the data is sent to a reassemble block 222, which reassembles the DTUs and sends the data to the upper layer. If the DTUs received at the demultiplexor 220 are eligible for retransmission, those DTUs are sent to the receiver side retransmission buffer 218b to determine whether there are any uncorrectable errors. If there are uncorrectable errors or correctly received new data with missing sequence IDs, a retransmission request is sent back to the transmitter side retransmission buffer 218a to facilitate retransmission of the corrupted data. If there are no errors, the DTUs are sent to the reassemble block 222 for reassembly and sending to the upper layer.

If, at demultiplexor 220, the data is retransmitted data, the retransmitted data is sent to the receiver side retransmission buffer 218b for proper insertion with the receiver side retransmission buffer 218b prior to sending to the reassemble block 222 for reassembly and sending to the upper layer. Depending on the particular embodiment, another error check may be performed.

It should be noted that the required minimum size of the transmitter side retransmission buffer 218a to perform a single retransmission is the effective data rate ($R_d$) of packets "eligible" for retransmission times the round trip time (RTT), i.e. RTT·$R_d$, where RTT is in seconds and $R_d$ is bits/sec and the buffer size is in bits. To optimize efficiency in a retransmission event, the size of the data transmission unit (DTU) should be commensurate with the DMT symbol period. If the transmit packet size is large for the given data rate, then the packet may span multiple DMT symbols when transmitted on the line.

Figure 3:
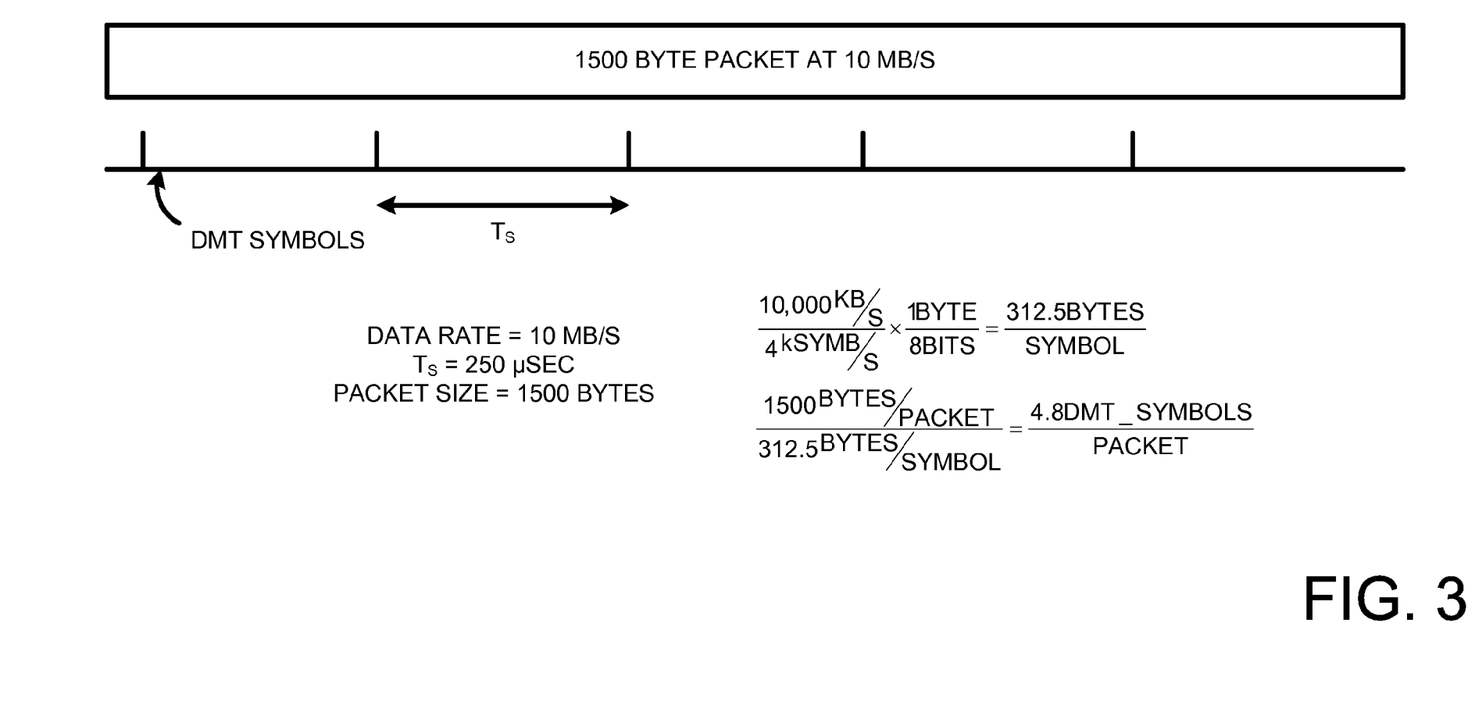
FIG. 3 illustrates a nonlimiting example of transmission of a 1500 byte packet on a 10 Megabit per second discrete multi-tone (DMT) link, such as may be utilized in the computing system of FIG. 2.

FIG. 3 illustrates a nonlimiting example of transmission of a 1500 byte packet on a 10 Megabit per second discrete multi-tone (DMT) link, as may be utilized in the computing system of FIG. 2. As illustrated in FIG. 3, if the packet size is 1500 bytes and the data rate is 10 Mb/s, then the packet will span 4.8 DMT symbols per packet. However, depending on the alignment with the DMT symbol boundaries, the packet may span 5 or 6 DMT symbols. In the event of an impulse noise event affecting one (or more) DMT symbol(s) carrying the 1500 byte packet, the entire packet would need to be retransmitted. To improve the efficiency the packet may be fragmented into DTU sizes that are commensurate with the DMT symbols. The DTU size may be determined based on the values of actual net data rate net_act$_n$ in the PTM-TC layer 106.

Figure 4:
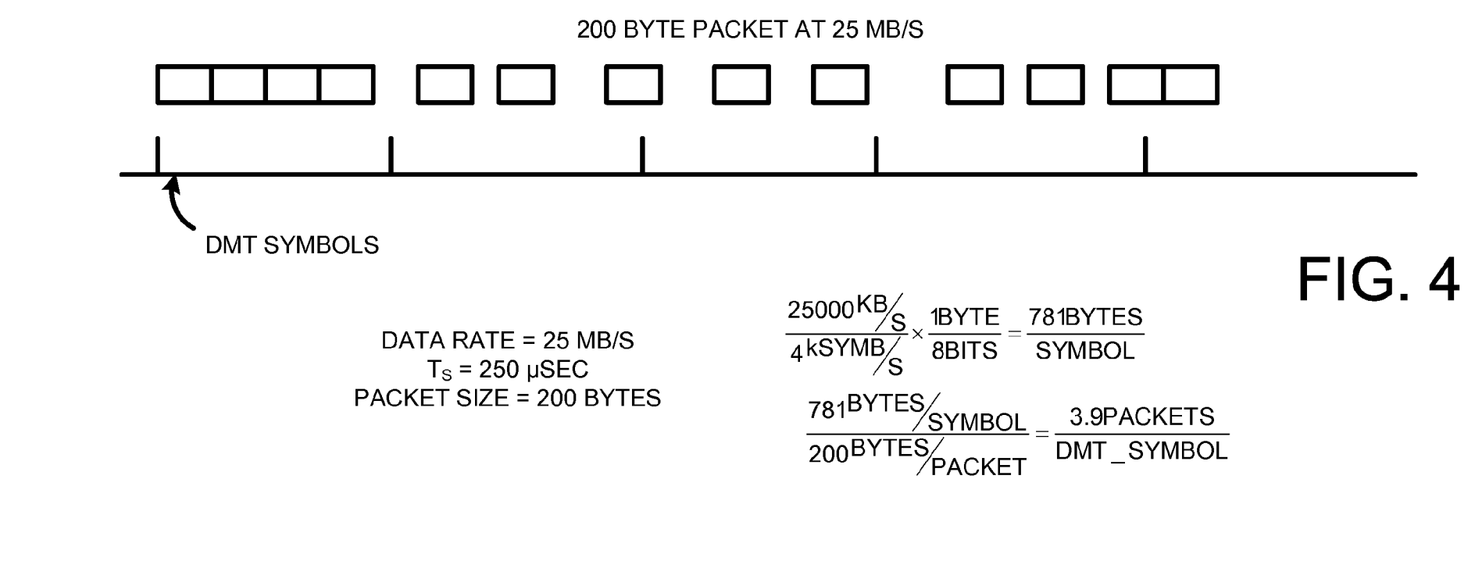
FIG. 4 illustrates a nonlimiting example of transmission of 200 byte packets on a 25 megabit per second DMT link, similar to the diagram from FIG. 3.

FIG. 4 illustrates a nonlimiting example of transmission of 200 byte packets on a 25 megabit per second DMT link, similar to the diagram from FIG. 3. As illustrated in the nonlimiting example of FIG. 4, if the packet sizes for the given data rate are small relative to the DMT symbol period, then one DMT symbol may actually carry more than one packet. For example, if the data rate is 25 Mb/s and packet size is 200 bytes, then a DMT symbol on average could contain 3.9 packets. In this scenario, if an impulse noise event hits one DMT symbol, only the affected eligible packets would be retransmitted. For the case of short packets, the DTU may be formed to contain more than one short packet. Implementation of the DTU size may be based on the value of the actual net data rate net_act$_n$ in the PTM-TC layer 106. The fragmentation procedure may be based on that of the Ethernet bonding protocol defined in G.998.2.

It should be noted that the packets that are "not-eligible" for retransmission do not need to be fragmented. Additionally, the overhead bits for each DTU would need to contain the following information: Flag bits to identify a DTU as "eligible" or "not-eligible" for retransmission; sequence identification (SID) bits to identify sequence of transmitted fragments; checksum bits (e.g. CRC) to check for errors in the received DTU; "start of packet" bit and "end of packet" bit to identify the packet fragment as the beginning of a packet, end of a packet, middle of a packet, or a fully contained packet in a single fragment.

Figure 5:
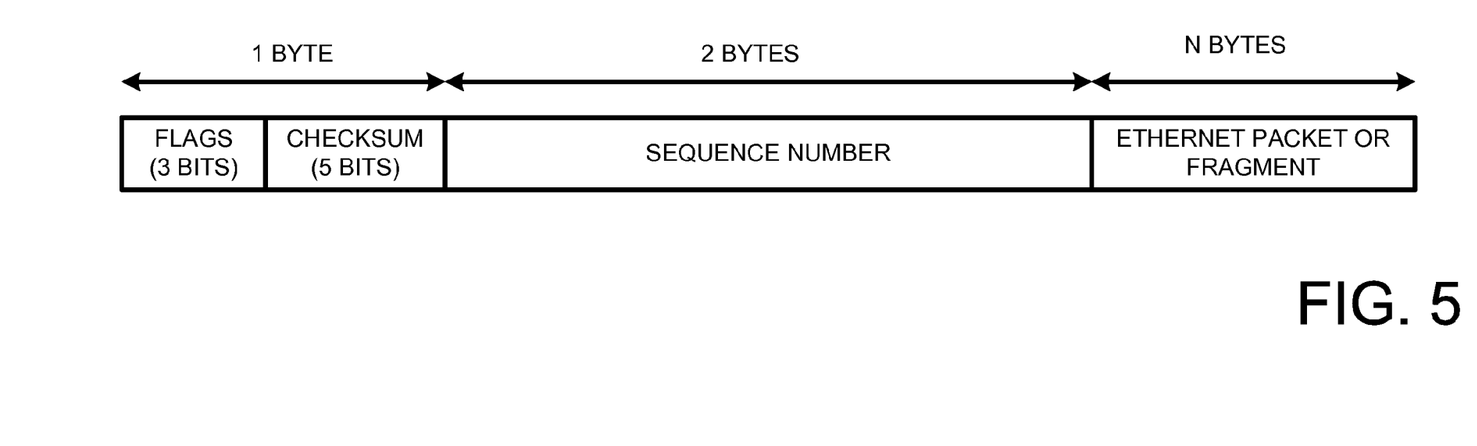
FIG. 5 illustrates a nonlimiting example of a transmit data unit format for fragmentation, such as may be utilized in the computing system of FIG. 2.

FIG. 5 shows the format of the transmit data unit, which is a result of the packet fragmentation operation. As illustrated in the nonlimiting example of FIG. 5, one byte is allocated for implementation of the checksum (5 bits) and flags (3 bits); 2 bytes are allocated for the sequence number definition, and N bytes are allocated for the fragmented value.

Figure 6:
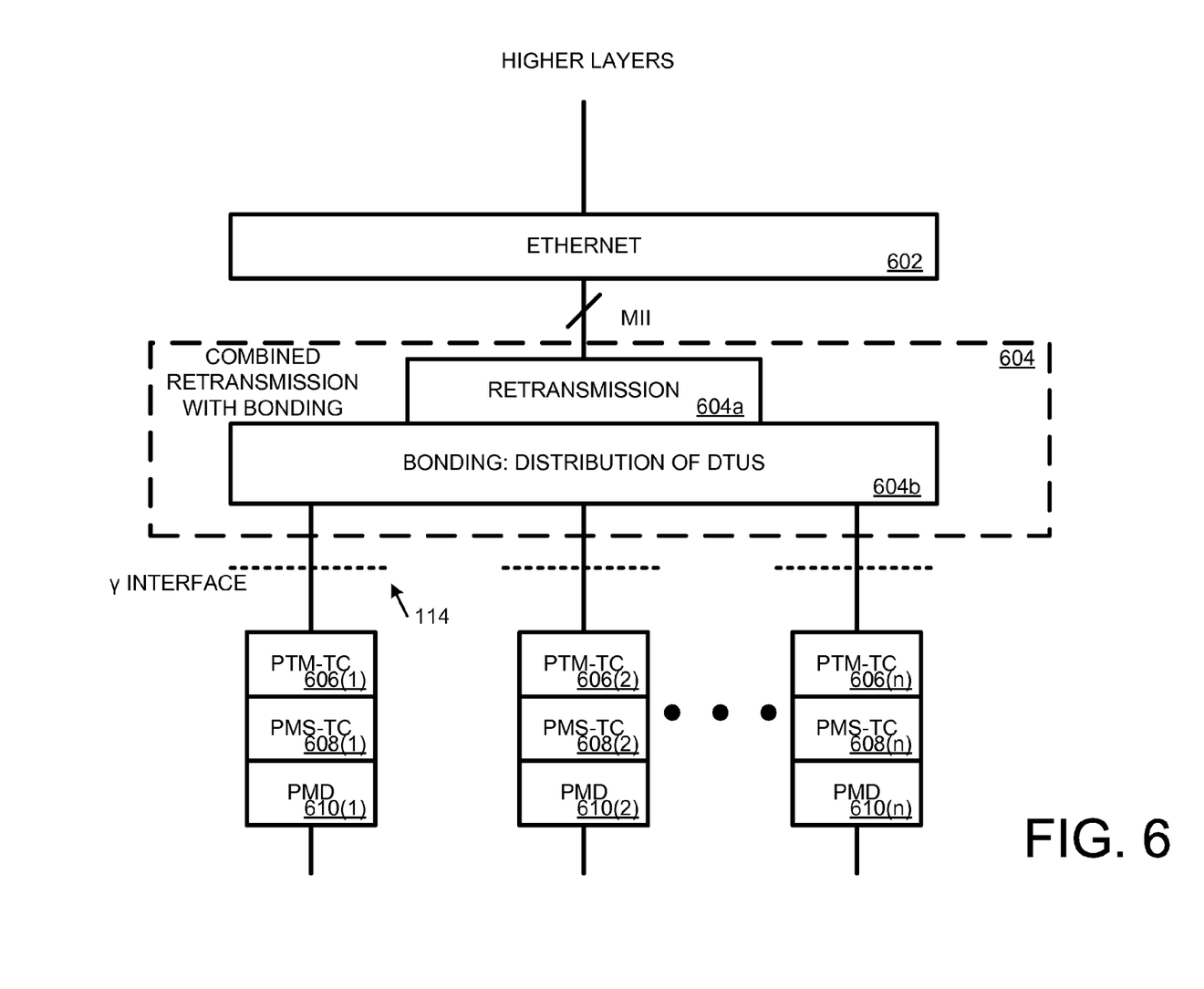
FIG. 6 illustrates an example embodiment of a computing environment, which includes a retransmission layer above the $\gamma$ interface, while utilizing a bonding layer, similar to the diagram from FIG. 1.
Figure 7:
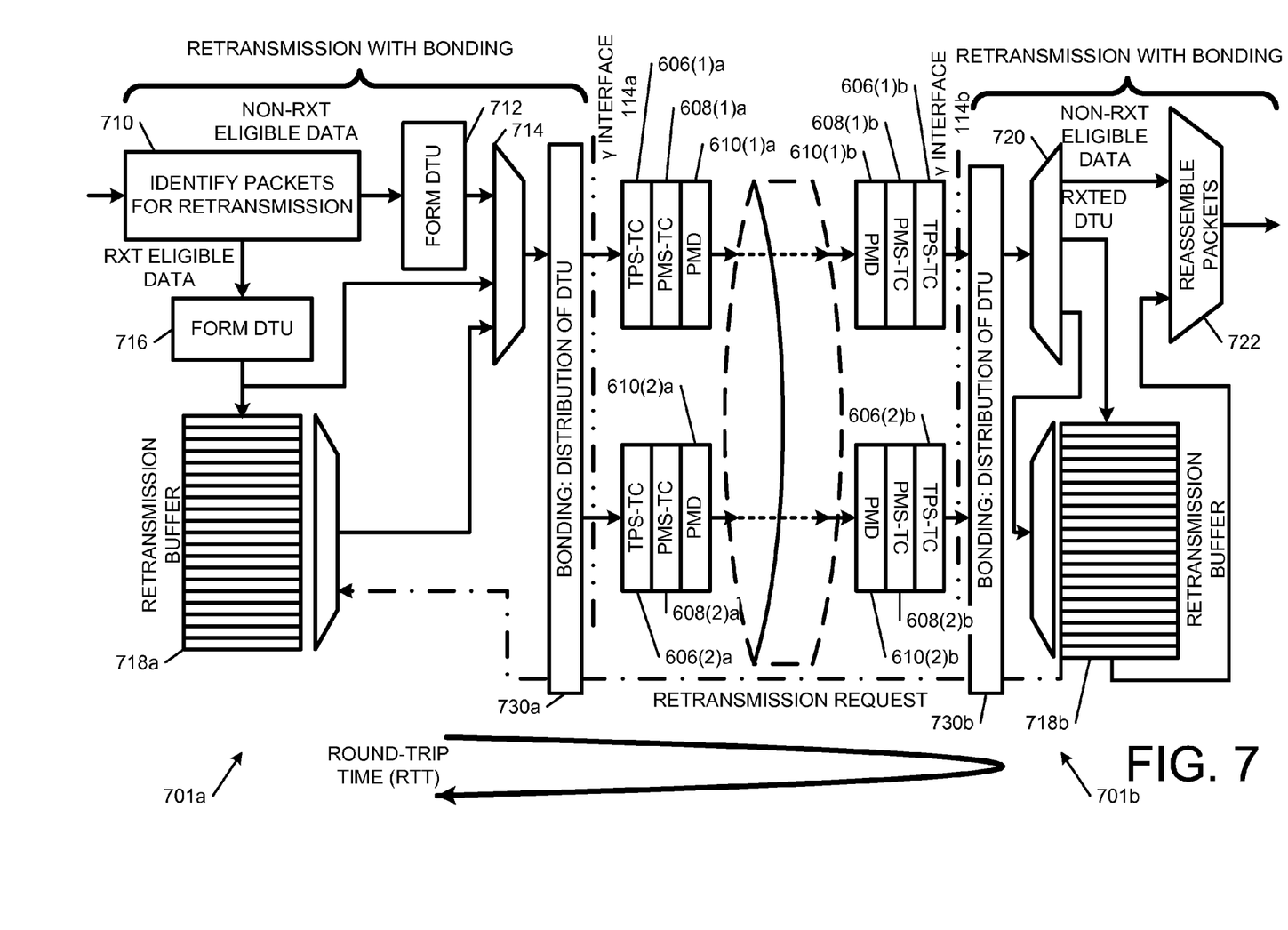
FIG. 7 illustrates an example embodiment of a computing system that includes a bonding layer, such as may be utilized in the environment from FIG. 6.

FIG. 6 shows a protocol reference model for use of retransmission with Ethernet bonding. FIG. 7 shows the retransmission operation relative to the bonding operation. The packets received from the Ethernet layer 602 are checked for QoS and are each designated as "eligible" or "not-eligible" for retransmission. The packets are then fragmented into DTUs per the fragmenting rules of G.998.2; additional overhead is added to each fragment to identify each DTU as "eligible" or "not-eligible" for retransmission. The retransmission "eligible" DTUs are sent on the appropriate link in the bonded group and also loaded into the retransmission buffer 718*a;* the "non-eligible" for retransmission DTUs are sent directly to the designated link in the bonding group without being copied into the retransmission buffer.

At the receive side 701*b*, each correctly received DTU is checked for eligibility of retransmission. The DTUs "not-eligible" for retransmission are recombined by the bonding layer 730*b* into their original packet and forwarded to an upper layer. If a DTU is received in error or there is a gap in the received sequence ID of new correctly received DTUs, then a request for retransmission is sent back to the transmitter side 701*a* and the requested DTU is retransmitted on any available link in the bonding group.

It should be noted that embodiments disclosed herein provide implementation of retransmission above the γ-interface 114 and may offer the following advantages: As is done with bonding, retransmission above the γ-interface may be applied to any DSL PHY, e.g. VDSL2, ADSL2, etc. Retransmission is applied only to packets supporting low error rate QoS, such as video. Delay sensitive packets, such as VoIP and gaming do not need retransmission. Accordingly, in at least one embodiment, retransmission shall be defined above the γ-interface so as to be applicable to numerous DSL PHYs, e.g. VDSL2, ADSL2, etc.

Referring specifically to FIG. 6, in at least one embodiment the computing environment may include an Ethernet layer 602 that is coupled to a combined retransmission and bonding layer 604. The combined retransmission and bonding layer 604 may include a retransmission component 604*a* and a bonding component 604*b*. The combined retransmission and bonding layer 604 may be additionally coupled to a plurality of PTM-TC layers 606(1)-606(*n*) across a γ interface 114. the PTM-TC layers 606(1)-606(*n*) may each be coupled to respective PMS-TC layers 608(1)-608(*n*), which may each be coupled to respective PMD layers 610(1)-610(*n*).

Similarly, referring specifically to FIG. 7, data may be received from the Ethernet layer 602 at a transmitter side 701*a* at block 710. Block 710 may be configured to identify those packets that are eligible for retransmission. If one or more packets are eligible for transmission, those packets are sent to DTU block 716 to convert those packets into DTUs. The DTUs are then sent to a multiplexor 714, as well as to the retransmission buffer 718*a* for storage in case of retransmission.

If, at block 710, one or more received packets are not eligible for retransmission, those packets are sent to DTU block 712 to form DTUs from those packets. The DTUs are then sent to the multiplexor 714 for sending to the bonding layer 730*a*. The data (whether eligible for retransmission, not eligible for retransmission, or in retransmission) is sent across the γ interface 114*a* to the designated TPS-TC layer 606, PMS-TC layer 608, and PMD layer 610.

The transmitted DTUs are then received at a receiver side 701*b* at a respective PMD layer 606*b* and sent across a γ interface 114*b* via a PMS-TC layer 608 and TPS-TC layer 606. The data may then be received at a bonding layer 730*b*. From the bonding layer 730*b*, the correctly received DTUs may be sent to a demultiplexor 720, which determines whether the DTUs are not eligible for retransmission, eligible for retransmission, or retransmitted. If the DTUs are not eligible for retransmission, those DTUs are sent to the reassemble block 722 for reassembly and sending to higher layers.

If at demultiplexor 720, the DTUs are determined to be eligible for retransmission that data may be sent to a receiver side retransmission buffer 718*b* in support of the transmission management protocol. If the DTUs include one or more uncorrectable errors or there are any missing sequence ID numbers in the new correctly received data, then a retransmission request may be sent from the receiver side retransmission buffer 718*b* to the transmitter side retransmission buffer 718*a*. The transmitter side retransmission buffer 718*a* may determine which DTU(s) to retransmit. If the data at receiver side retransmission buffer 718*b* includes correctly received DTUs, then the DTUs may be sent to the reassemble block 722 for packet reassembly and sending of the reassembled packets to the higher layers.

Similarly, if the DTUs at demultiplexor 720 are retransmitted data, the retransmitted DTUs may be sent to the receiver side retransmission buffer 718*b* to reconnect to the DTUs that did not include errors. The DTUs in the receiver side retransmission buffer 718*b* may be sent to the reassemble block 722 for reassembly and sending to higher layers.

Figure 8:
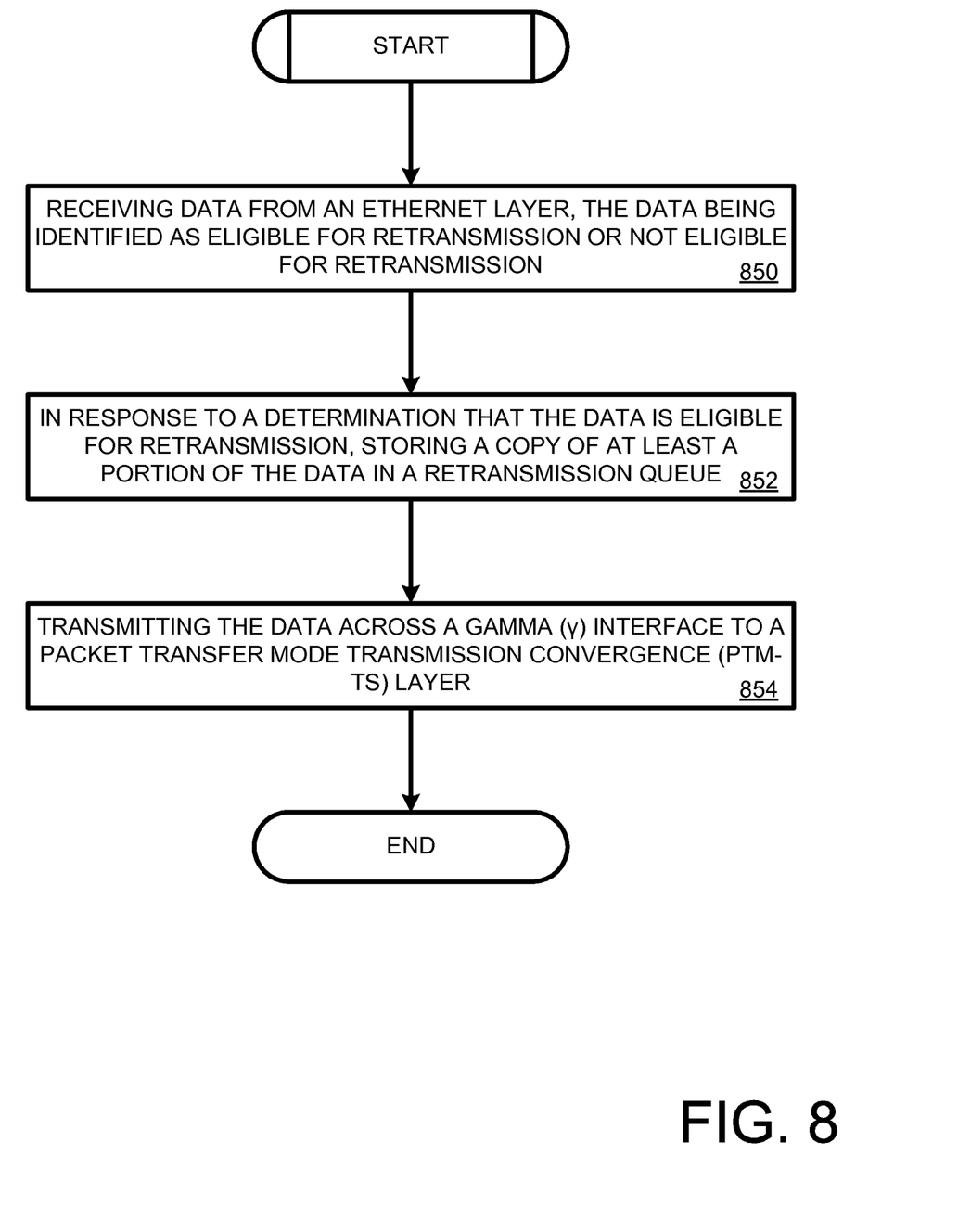
FIG. 8 illustrates an exemplary process that may be utilized in storing data for retransmission, such as in the system of FIG. 2.

FIG. 8 illustrates an exemplary process that may be utilized in storing data for retransmission, such as in the system of FIG. 2. As illustrated in the nonlimiting example of FIG. 8, data may be received (e.g., at a receiver side 201*a*) from the Ethernet layer 102, the data being identified as eligible for retransmission or not eligible for retransmission (block 850). Additionally, in response to a determination that the data is eligible for retransmission, a copy of at least a portion of the data can be stored in a retransmission queue 218*a* (block 852). The data can additionally be transmitted across the gamma (γ) interface to the PMS-TC layer 106 (block 854).

Figure 9:
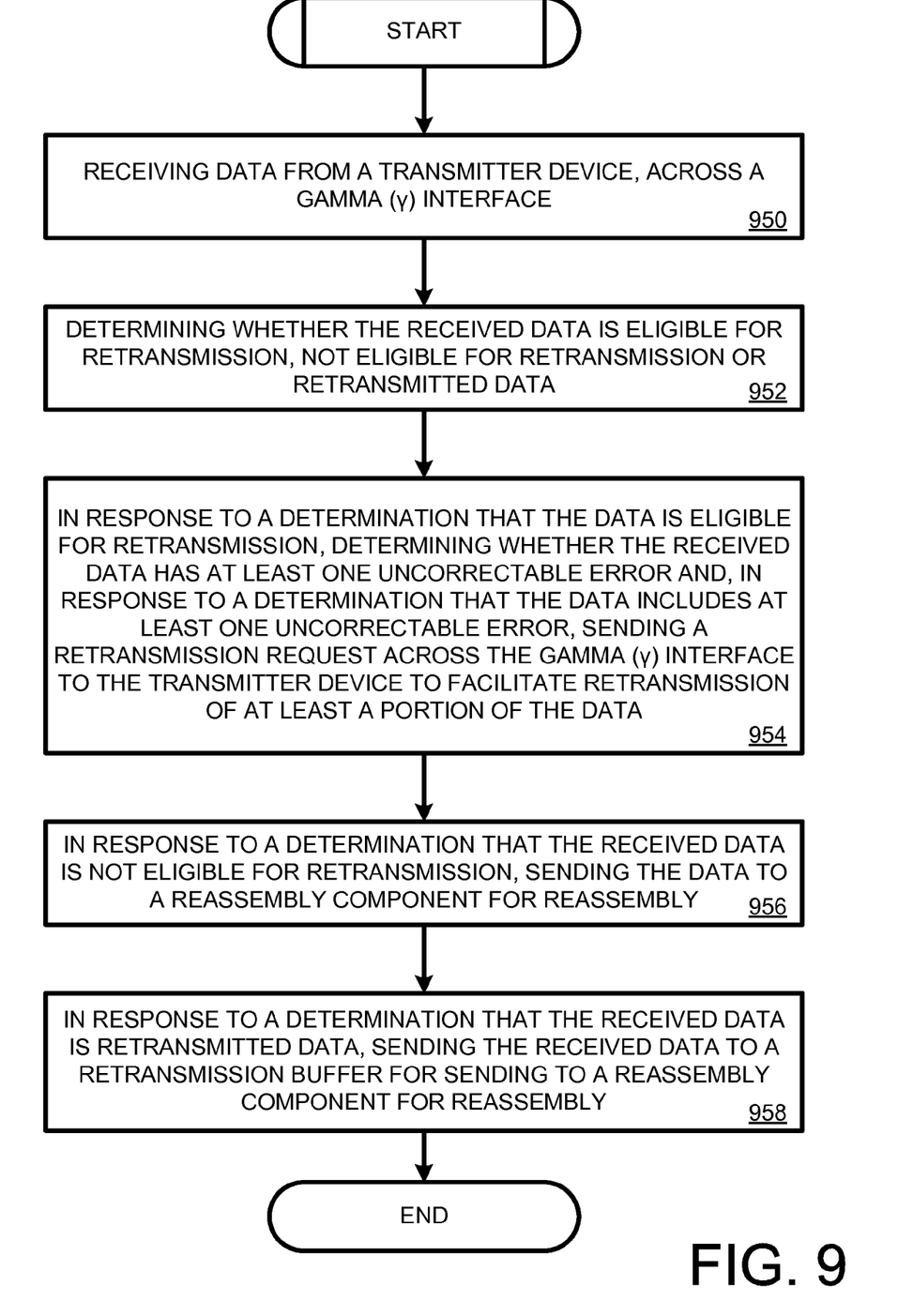
FIG. 9 illustrates an exemplary process that may be used for sending a retransmission request, such as in the system from FIG. 2.

FIG. 9 illustrates an exemplary process that may be used for sending a retransmission request, such as in the system from FIG. 2. More specifically, as illustrated in the nonlimiting example of FIG. 9, data may be received from a transmitter device (e.g., transmitter side 201*a*) across a gamma (γ) interface 114 (block 950). A determination can be made regarding whether the received data is eligible for retransmission, not eligible for retransmission, or retransmitted data (block 952). In response to a determination that the data is eligible for retransmission, a determination can be made regarding whether the received data has at least one uncorrectable error. In response to a determination that the received data includes at least one uncorrectable error, a retransmission request can be sent to the transmitter device to facilitate retransmission of at least a portion of the data (block 954). In response to a determination that the received data is not eligible for retransmission, the data can be sent to a reassembly component for reassembly (block 956). In response to a determination that the received data is retransmitted data, sending the received data to a retransmission buffer 218*b* prior to sending the data to the reassembly component 222 for reassembly (block 958).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all combinations and sub-combinations of all elements, features, and aspects discussed above. All such modifications and variations are intended to be included herein within the scope of this disclosure.

Therefore, at least the following is claimed:

1. A retransmission method, comprising:
   receiving data from an Ethernet layer, the data being identified as eligible for retransmission or not eligible for retransmission;
   in response to a determination that the data is eligible for retransmission, storing a copy of at least a portion of the data in a retransmission queue; and
   transmitting the data across a gamma (Y) interface to a packet transfer mode transmission convergence layer.

2. The method of claim 1, further comprising, in response to a determination of an error in the transmitted data, retransmitting at least a portion of the data across the gamma (Y) interface to the packet transfer mode transmission convergence layer.

3. The method of claim 1, further comprising fragmenting at least a portion of the data received from the Ethernet layer.

4. The method of claim 1, further comprising bonding at least a portion of the data.

5. The method of claim 1, further comprising adding at least a one byte header to the data prior to sending the data across the gamma (Y) interface to the packet transfer mode transmission convergence layer.

6. The method of claim 1, further comprising retransmitting control data across the gamma (Y) interface to the packet transfer mode transmission convergence layer, the retransmission control data indicating data to retransmit.

7. A retransmission system, comprising:
   a demultiplexor configured to receive data from a transmitter device across a gamma (Y) interface, the demultiplexor configured to determine whether the received data is at least one of the following: eligible for retransmission, not eligible for retransmission, and retransmitted; and
   a retransmission buffer coupled to the demultiplexor, the retransmission buffer configured to, in response to a determination that the received data is eligible for retransmission, determine whether the received data has at least one uncorrectable error or is missing at least one DTU because of a detected gap in received sequence identifiers of correctly received DTUs and, in response to a determination that the data includes at least one uncorrectable error or is missing at least one DTU because of a detected gap in received sequence identifiers of correctly received DTUs, send a retransmission request across the gamma (Y) interface to the transmitter device to facilitate retransmission of at least a portion of the data,
   the retransmission buffer further configured to, in response to a determination that the received data is retransmitted data, recombine the retransmitted data with stored data for sending to a reassembly block.

8. The system of claim 7, further comprising a reassemble block configured to receive and reassemble data from the demultiplexor and retransmission buffer.

9. The system of claim 8, the demultiplexor further configured to, in response to a determination that the received data is not eligible for retransmission, send the data to the reassemble block for reassembly.

10. The system of claim 7, the demultiplexor further configured to, in response to a determination that the data includes at least one uncorrectable error, receive retransmitted data from the transmitter device, across the gamma (Y) interface, corresponding to the data that includes at least one uncorrectable error.

11. The system of claim 7, retransmission buffer further configured to, determine whether the retransmitted error includes at least one uncorrectable error.

12. The system of claim 7, wherein the received data is received as one or more data transmission units (DTUs).

13. A retransmission system, comprising:
   an identifying block configured to receive data from an Ethernet layer, the identifying block configured to determine whether the received data is eligible for retransmission or not eligible for retransmission;
   a retransmission buffer configured to, in response to a determination that the data is eligible for retransmission, storing at least a portion of the data; and a transmitting component configured to transmit the received data across a gamma (Y) interface to a packet transfer mode transmission convergence layer.

14. The system of claim 13, the retransmission buffer further configured to, in response to a determination of an error in the transmitted data, retransmit at least a portion of the data across the gamma (Y) interface to the packet transfer mode transmission convergence layer.

15. The system of claim 13, further comprising a first data transmission unit (DTU) block configured to receive data eligible for retransmission and fragment at least a portion of the data eligible for retransmission into one or more DTUs.

16. The system of claim 15, the first DTU block further configured to add at least a one byte header to the data prior to sending the data across the gamma (Y) interface to the packet transfer mode transmission convergence layer.

17. The system of claim 13, further comprising a bonding layer configured to provide an interface between a plurality of TPS-TC layers and the gamma (Y) interface.

18. The system of claim 13, further comprising retransmitting control data across the gamma (Y) interface to the packet transfer mode transmission convergence layer, the retransmission control data indicating data to retransmit.

19. The system of claim 13, further comprising a second data transmission unit (DTU) block configured to receive data that is not eligible for retransmission and fragment at least a portion of the data not eligible for retransmission into one or more DTUs.

* * * * *

UNITED STATES PATENT AND TRADEMARK OFFICE
CERTIFICATE OF CORRECTION

Page 1 of 2

PATENT NO. : 8,413,000 B2
APPLICATION NO. : 12/620832
DATED : April 2, 2013
INVENTOR(S) : Sorbara et al.

It is certified that error appears in the above-identified patent and that said Letters Patent is hereby corrected as shown below:

On Title Page 2, in Item (56), under "OTHER PUBLICATIONS", in Column 1,
Line 3, delete "calls\Jan. 31," and insert -- calls/Jan. 31, --, therefor.

On Title Page 2, in Item (56), under "OTHER PUBLICATIONS", in Column 1,
Line 5, delete ""ADLS:G.vdsl:" and insert -- "ADSL:G.vdsl: --, therefor.

On Title Page 2, in Item (56), under "OTHER PUBLICATIONS", in Column 1,
Line 8, delete ""G. ADLS/G. VDSL:" and insert -- "G. ADSL/G. VDSL: --, therefor.

On Title Page 2, in Item (56), under "OTHER PUBLICATIONS", in Column 2,
Line 1, delete ""ADLS," and insert -- "ADSL, --, therefor.

On Title Page 2, in Item (56), under "OTHER PUBLICATIONS", in Column 2,
Line 6, delete ""G.vds12:" and insert -- "G.vdsl2: --, therefor.

On Title Page 2, in Item (56), under "OTHER PUBLICATIONS", in Column 2,
Lines 10-11, delete "Ad Hock" and insert -- Ad Hoc --, therefor.

In the Specifications:

In Column 3, Line 11, delete "PMT-TC" and insert -- PTM-TC --, therefor.

In Column 3, Line 17, delete "(QOS)" and insert -- (QoS) --, therefor.

In the Claims:

In Column 7, Line 64, in Claim 1, delete "gamma (Y)" and insert -- gamma ($\gamma$) --, therefor.

In Column 8, Line 1, in Claim 2, delete "gamma (Y)" and insert -- gamma ($\gamma$) --, therefor.

Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,413,000 B2

In Column 8, Line 10, in Claim 5, delete "gamma (Y)" and insert -- gamma ($\gamma$) --, therefor.

In Column 8, Line 13, in Claim 6, delete "gamma (Y)" and insert -- gamma ($\gamma$) --, therefor.

In Column 8, Line 18, in Claim 7, delete "gamma (Y)" and insert -- gamma ($\gamma$) --, therefor.

In Column 8, Line 34, in Claim 7, delete "gamma (Y)" and insert -- gamma ($\gamma$) --, therefor.

In Column 8, Line 51, in Claim 10, delete "gamma (Y)" and insert -- gamma ($\gamma$) --, therefor.

In Column 9, Line 1, in Claim 13, delete "gamma (Y)" and insert -- gamma ($\gamma$) --, therefor.

In Column 9, Line 6, in Claim 14, delete "gamma (Y)" and insert -- gamma ($\gamma$) --, therefor.

In Column 9, Line 14, in Claim 16, delete "gamma (Y)" and insert -- gamma ($\gamma$) --, therefor.

In Column 9, Line 18, in Claim 17, delete "gamma (Y)" and insert -- gamma ($\gamma$) --, therefor.

In Column 9, Line 20, in Claim 18, delete "gamma (Y)" and insert -- gamma ($\gamma$) --, therefor.